US012157152B2

(12) United States Patent
Lee et al.

(10) Patent No.: US 12,157,152 B2
(45) Date of Patent: Dec. 3, 2024

(54) METHOD AND APPARATUS FOR SEPARATING WASTE MATERIALS

(71) Applicant: Prototype Garage LLC, Little Canada, MN (US)

(72) Inventors: Olaf N. Lee, Columbus, MN (US); Greg Allen White, Lino Lakes, MN (US); Haakon Oliver Ostenson, Shoreview, MN (US)

(73) Assignee: Prototype Garage LLC, Little Canada, MN (US)

( * ) Notice: Subject to any disclaimer, the term of this patent is extended or adjusted under 35 U.S.C. 154(b) by 462 days.

(21) Appl. No.: 17/401,497

(22) Filed: Aug. 13, 2021

(65) Prior Publication Data

US 2022/0062963 A1 Mar. 3, 2022

Related U.S. Application Data

(60) Provisional application No. 63/071,114, filed on Aug. 27, 2020.

(51) Int. Cl.
*B09B 3/00* (2022.01)
*B05B 1/08* (2006.01)
(Continued)

(52) U.S. Cl.
CPC .................. *B09B 3/00* (2013.01); *B05B 1/08* (2013.01); *B67B 7/24* (2013.01); *B09B 2101/02* (2022.01)

(58) Field of Classification Search
CPC ............. Y10T 83/0443; Y10T 83/2066; Y10T 83/2068; B09B 3/00; B09B 2101/02;
(Continued)

(56) References Cited

U.S. PATENT DOCUMENTS 4,662,893 A * 5/1987 McIntosh ........... B01D 11/0273 210/174
5,460,085 A 10/1995 Cappellari et al.
(Continued)

FOREIGN PATENT DOCUMENTS

BE 1016213 A3 5/2006
EP 0521685 A2 1/1993
(Continued)

OTHER PUBLICATIONS

International Preliminary Report on Patentability issued in International Application No. PCT/US2021/045856, mailed on Mar. 9, 2023, 9 pages.

(Continued)

*Primary Examiner* — Phong H Nguyen
(74) *Attorney, Agent, or Firm* — Dorsey & Whitney LLP

(57) ABSTRACT

A jetted bag opener separates mixed solid waste from flexible containers such as plastic and paper bags, and includes a housing configured with an ingress and an egress, at least two sets of a plurality of fluid delivery nozzles, where a first set of the nozzles is arranged along a sidewall at a first side of the housing, and a second set of the nozzles is arranged along the sidewall at a second side of the housing opposite the first side, and as fluid is sprayed from the nozzle outlets, the fluid is delivered at a force sufficient to penetrate into the flexible containers passing through the housing to thereby create an opening in the flexible containers for release of the mixed solid waste held therein.

16 Claims, 6 Drawing Sheets

100 600 202 300 201 200 400 500

(51) Int. Cl.

| | |
|---|---|
| ***B67B 7/00*** | (2006.01) |
| *B09B 101/02* | (2022.01) |

(58) Field of Classification Search
CPC ............ B09B 2101/70; B09B 2101/75; B09B 2101/85; B05B 1/08; B67B 7/24
See application file for complete search history.

(56) References Cited

U.S. PATENT DOCUMENTS

| | | | |
|---|---|---|---|
| 5,484,247 | A | 1/1996 | Clark et al. |
| 5,875,979 | A | 3/1999 | Walters et al. |
| 6,409,106 | B1 | 6/2002 | Levasseur et al. |
| 7,226,006 | B2 | 6/2007 | Porter et al. |
| 7,497,392 | B2 | 3/2009 | Lee et al. |
| 8,034,132 | B2 | 10/2011 | Lee et al. |
| 2004/0226867 | A1 | 11/2004 | Tse |
| 2006/0169857 | A1 | 8/2006 | Hawkins et al. |
| 2013/0171725 | A1 * | 7/2013 | Koh ...................... B02C 18/142 241/79 |
| 2013/0220893 | A1 | 8/2013 | Sukkar |
| 2016/0257923 | A1 | 9/2016 | Lee |

FOREIGN PATENT DOCUMENTS

| | | | |
|---|---|---|---|
| EP | 2753547 | B1 | 5/2015 |
| GB | 2230004 | A | 10/1990 |
| JP | 2000-246697 | * | 9/2000 |
| WO | 9014890 | A1 | 12/1990 |

OTHER PUBLICATIONS

International Search Report and Written Opinion issued in International Application No. PCT/US2023/063550, mailed on Nov. 22, 2023, 13 pages.
International Search Report and Written Opinion issued in International Application No. PCT/US2023/063552, mailed on Nov. 22, 2023, 12 pages.
International Search Report and Written Opinion issued in International Application No. PCT/US2021/045856, mailed on Nov. 30, 2021, 10 pages.
Extended European Search Report issued in European Patent Application No. 21862372.6, mailed on Sep. 3, 2024, 9 pages.
International Preliminary Report on Patentability issued in International Application No. PCT/US2023/063550, mailed on Sep. 12, 2024, 9 pages.
International Preliminary Report on Patentability issued in International Application No. PCT/US2023/063552, mailed on Sep. 12, 2024, 9 pages.

* cited by examiner

METHOD AND APPARATUS FOR SEPARATING WASTE MATERIALS

CROSS REFERENCE TO RELATED APPLICATION

This application claims priority to U.S. Provisional Patent Application No. 63/071,114, filed Aug. 27, 2020, entitled "METHOD AND APPARATUS FOR SEPARATING WASTE MATERIALS INTO FRACTIONS FOR RECYCLING," which is incorporated by reference herein, in the entirety and for all purposes.

FIELD OF TECHNOLOGY

Provided herein are waste treatment methods and apparatuses for separating waste, for instance, into recyclable fractions, and more particularly relates to providing a fluid-driven bag opener device for releasing mixed solid waste contents from sealed bags into a waste processing system and methods for using the fluid-driven bag opener.

BACKGROUND

Recycling programs are commonplace for households and businesses, but divert only a portion of recyclable and compostable material away from landfills or incineration. Discarded waste, e.g., municipal solid waste (MSW), collected by waste companies typically contain 40 to 60 wt % recyclable, compostable or biodegradable material. Several approaches have been used to convert MSW into fuel or to reclaim recyclable materials. For instance, U.S. Pat. Nos. 7,497,392 and 8,034,132 disclose processes and apparatuses that use a pressure vessel to transform solid waste into fuel by adding steam to the vessel over a period of time. US 20160257923 A1 discloses methods and apparatuses that use a vacuum below atmospheric pressure to break cell walls in organic material to increase available free sugars and convertible surface area.

These prior approaches use vessels to treat solid waste using steam, and process the waste at increased temperature and pressure. Moisture, temperature, and pressure varies within the vessel, and rotary agitation can cause the solid waste product to degrade into fuel while separating non-fuel waste components such as metal, glass, and plastic using magnets, density, and particle size-type separating systems such as a trommel or flat bed separator.

While known systems and methods are suited for their intended purposes, the approaches herein provide waste treatment methods and apparatuses for separating waste into recyclable fractions that does not rely on steam or vacuum, or convert the recyclable material into fuel.

SUMMARY

Provided are methods and systems for separating a waste stream of mixed solid waste into recyclable fractions at a rate of about 10 to 50 tons per hour based on weight of the mixed solid waste.

Implementations provide a device configured for separating mixed solid waste from flexible containers holding the mixed solid waste, which may include a housing configured with an ingress and an egress for permitting a plurality of the flexible containers holding the mixed solid waste to pass through the housing via the ingress and the egress. The flexible containers may be plastic bags and paper bags, for example. The housing may include at least two sets of a plurality of fluid delivery nozzles, where a first set of the plurality of fluid delivery nozzles is arranged along a sidewall at a first side of the housing, and a second set of the plurality of fluid delivery nozzles is arranged along the sidewall at a second side of the housing opposite the first side. Nozzle outlets of the first set of nozzles may direct sprayed fluid towards the second side of the housing, and nozzle outlets of the second set of nozzles may direct sprayed fluid towards the first side of the housing. The fluid sprayed from the nozzle outlets may be delivered at a force sufficient to cause the fluid to penetrate into the flexible containers passing through the housing to thereby create openings in the flexible containers for release of the mixed solid waste held therein.

Other implementations provide a device for separating mixed solid waste from flexible containers by providing a housing and at least two sets of fluid delivery nozzles, where a first set of the nozzles may be arranged along a sidewall at a first side of the housing, and a second set of the nozzles may be arranged along the sidewall at a second side of the housing such that nozzle outlets of the first and second sets of nozzles direct sprayed fluid towards an interior of the housing. Fluid sprayed from the nozzle outlets may be delivered at a force sufficient to cause the fluid to penetrate into the flexible containers passing through the housing to thereby create openings in the flexible containers for release of the mixed solid waste held therein.

Further implementations provide a method of separating mixed solid waste from flexible containers holding the mixed solid waste, which may involve depositing a plurality of the flexible containers holding the mixed solid waste into an ingress of a housing wherein the plurality of flexible containers comprise plastic bags and paper bags, followed by using at least two sets of a plurality of fluid delivery nozzles to direct an oscillating spray towards an interior of the housing via nozzle outlets of the fluid delivery nozzles such that oscillating fluid sprayed from the nozzle outlets is delivered at a force sufficient to cause the fluid to penetrate into the flexible containers passing through the housing to thereby create openings in the flexible containers for release of the mixed solid waste held therein, wherein a first set of nozzles is arranged along a first side of the housing, and a second set of nozzle is arranged along the sidewall at a second side of the housing. The flexible containers having the openings and the sprayed fluid may then pass through an egress of the housing for further mixed waste stream processing.

In view of the foregoing various implementations and alternatives may be provided. For instance, the first set of the plurality of fluid delivery nozzles may be arranged at a vertical position of the housing that is vertically higher from a vertical position of the housing where the second set of the plurality of fluid delivery nozzles is arranged, according to certain. In addition, a third set of a plurality of fluid delivery nozzles may be provided and arranged at the first side of the housing and at a vertical position of the housing that differs from the vertical positions of the first and second sets of the nozzles. The nozzle outlets of the first set of nozzles may spray across the housing using high pressure streams that direct the flexible containers away from the first set of nozzles such that the flexible containers are directed towards the second set of nozzles at the second, opposite side of the housing, and the nozzle outlets of the second set of fluid delivery nozzles may spray across the housing using high pressure streams that direct the flexible containers away from the second set of nozzles such that the flexible containers are directed towards the third set of nozzles at the first side of the housing such that the flexible containers move from side to side within the housing, and the high pressure streams penetrate the flexible containers and saturate mixed solid waste held in the flexible containers. The fluid delivery nozzles may emit an oscillating spray perpendicular to the housing sidewall along which the nozzles are attached. The housing may be arranged so that flexible containers passing through the housing move through by gravity, and for instance, the fluid delivery nozzles may emit an oscillating spray perpendicular to the housing sidewall along which the nozzles are attached. The housing ingress and egress may be oriented vertically relative to a ground surface or at a downward angle to permit the flexible containers to pass though by gravity. In some implementations, top portion of the nozzles may be shielded, and for instance may be shielded by a ramp configured to cover the top portion of the nozzles. In some implementations, nozzles may be configured to operate at about 500 psi to about 10,000 psi, and the nozzles may be adjustable relative to the housing. The housing may include an opening about 3 feet to about 12 feet wide and a vertical length of about 3 feet to 24 feet.

DETAILED DESCRIPTION

Systems and methods separate waste streams into one or more recyclable streams to reduce the overall volume of waste that reaches landfills or incinerators. Waste streams contain a mixture of organic, recyclable and non-recyclable materials (e.g., materials that will eventually be sent to a landfill or incinerated). Organics include fruits and vegetables, meat, eggs, eggshells, grains, beans, dairy products, bones (bone meal), paper products (e.g., waxed cardboard, food boxes, napkins, paper towels, paper plates, milk cartons, tea bags, coffee grounds and filters, parchment and waxed papers, hair (pet hair), yard waste, plant and flowers, and so on. Organic materials may also be compostable and biodegradable. Organic materials typically account for 40 to 65 wt % of MSW. Recyclable materials include plastic, glass, metals (e.g., iron and aluminum) and some paper products (e.g., corrugated cardboard). Other materials in the waste stream such as construction materials, concrete, foam, rubber, diapers, and so on, are commonly disposed of in landfills or incinerators, e.g., these materials pass through the waste processing plant without having been separated in the streams of recyclable and organic materials.

According to implementations of the present disclosure, methods and systems for separating a waste stream of mixed solid waste into recyclable fractions at a rate of about 10 to 50 tons per hour based on weight of the mixed solid waste. Waste from the mixed waste streams may be delivered to a processing facility, such as a waste processing facility using waste delivery vehicles. Some of the mixed waste stream may arrive in bags such as plastic or paper garbage bags that require opening prior to processing the waste contained therein. Bag splitters provided according to the present disclosure may enable waste contained in garbage bags to exit such bags using novel approaches that permit the waste to be immediately prepared for separation into multiple streams. The waste may be subsequently processed in multiple stages, such as two to five stages.

According to the present disclosure, implementations provide a novel hydration step for hydrating the waste using a stream of flowing water as the waste passes through a vessel during one or more of the waste processing stages. The combination of hydration and screening processes may facilitate sorting the waste into organic, recyclable and other waste streams. According to the present disclosure, the organic fraction of the waste from the one or more stages may be collected and subjected to a novel pressing process to extract moisture therefrom. The recyclable and other portions of the waste stream may be processed using a material recovery facility (MRF).

Figure 1:
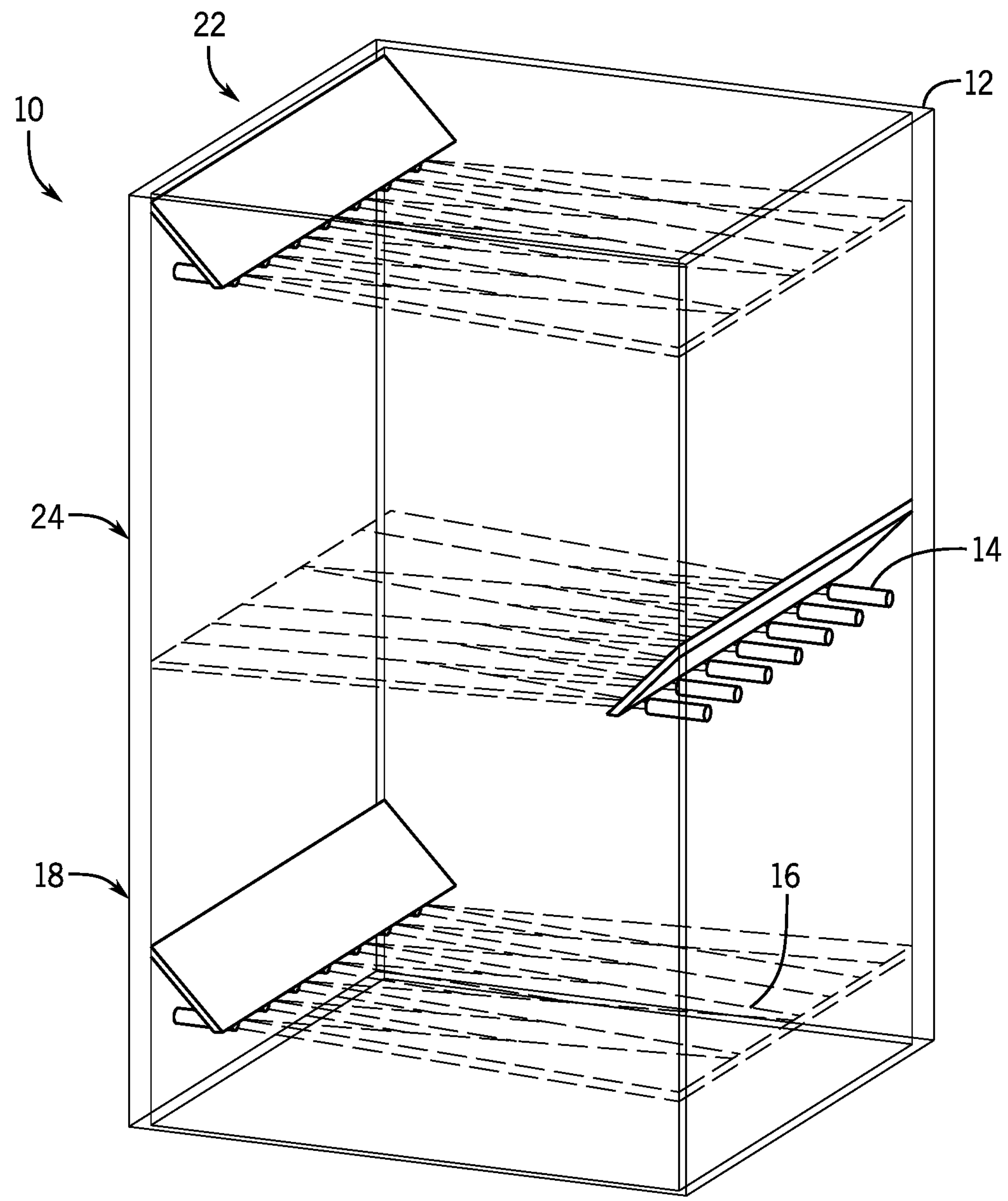
FIG. 1 illustrates a bag opener configured to release waste within a flexible container according to implementations of the present disclosure.
Figure 2:
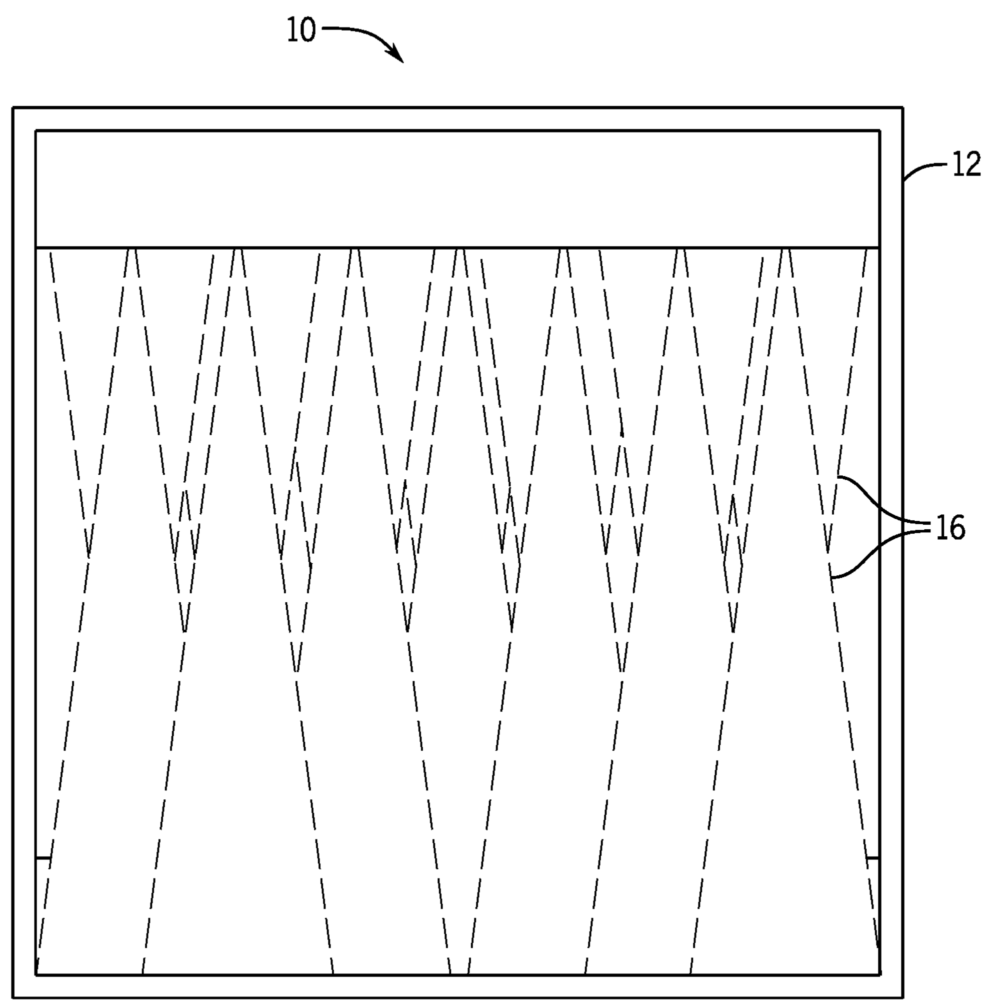
FIG. 2 illustrates a detail view of the tunnel of the bag opener.

Turning to the Figures, FIG. 1 illustrates a bag opener 10 according to the present disclosure. The bag opener 10 may be configured to release waste contained within a flexible container such as a plastic bag a paper bag or the like, such that the waste can be processed in a multi-stage waste separation system. For instance, after exiting the waste delivery vehicle, the waste is placed on a conveyance system such as a series of conveyors. The waste is then dropped into sorting apparatuses. As the waste is dropped, some is contained in bags or other flexible containers that require opening prior to processing the waste. These bags may be dropped through the bag opener 10 of FIG. 1, which may be configured as a tunnel 12 containing a series of nozzles 14. The nozzles 14 may spray jet water streams 16 that deliver high pressure water to break apart the bags to release and break apart the waste contained therein. The tunnel 12 may be oriented vertically or at a downward angle such as 45 degrees, to permit the bags to move through the tunnel by gravity. Nozzles 14 may be oriented at various angles in the tunnel 12. For instance, the nozzles 14 may emit spray perpendicular to gravity, parallel to gravity, and/or may emit spray at an angle relative to the tunnel, such as perpendicular to the tunnel (e.g., 90°), or at a selected angle within the tunnel. In some implementations, the nozzles 14 may be shielded such as by using a ramp 18 configured to cover the nozzles 14, or portions thereof, within the tunnel 12 to protect the nozzles 14 while permitting water streams 16 to deliver unobstructed high pressure water to the bags and their contents. Particularly, the nozzles 14 may deliver the high pressure water streams 16 to the bags as they pass one or more sets of nozzles 14 to break apart the bag and its contents. In FIG. 1, the tunnel 12 includes three banks of nozzles 14, with two of the banks of nozzles 14 spraying from a first side to a second side of the tunnel in a direction perpendicular to gravity, and one of the banks of nozzles 14 spraying from the second side to the first side of the tunnel in a direction perpendicular to gravity. As shown in the detail view of the tunnel 12 of the bag opener 10 in FIG. 2, by providing the nozzles 14 on opposite sides of the tunnel 12, the water streams 16 may spray across the tunnel using high pressure streams that direct the bags and waste away from each bank of nozzles 14, and towards the next bank of nozzles 14 on the opposite side of the tunnel 12 such that the bags and waste move from side to side within the tunnel 12 as the streams 16 further penetrate and saturate the waste and bags. It will be appreciated that more or less banks of nozzles 14 may be included in the bag opener 10 and may have various orientations and configurations.

The tunnel 12 may have an opening width and depth 22 of about 3 feet to 12 feet (or a diameter of about 3 feet to 12 feet when the tunnel is configured as a cylinder) and a length 24 of about 3 feet to about 24 feet. The nozzles 14 may operate at about 500 psi to about 10,000 psi, may be fixed, adjustable, or may oscillate within the tunnel 12. The temperature of the streams 16 may be about 32° F. to about 300° F. The temperature of the water may be about 32, 38, 40, 45, 60, 70, 80, 90, 100, 125, 150, 175, 200, or 212° F., or any temperature range of the aforementioned temperatures.

The number of nozzles 14 may correspond to a selected volume of the flow. Because some waste is water permeable or water soluble, such as organic waste, it may be wetted and broken down into smaller portions within the tunnel based on a percentage of mass to water required to saturate and break down the waste. This wetting process may increase the moisture content of the waste. For instance, organic material typically contains 11 to 35 wt % moisture and the wetting process may increase the moisture content of the organic material up to a point of saturation. Other components that do not absorb water, such as plastic, glass and metal, may also be broken apart or separated within the tunnel due to the high pressure at which the water is sprayed in the tunnel.

The wetted, mixed waste from the bag opener 10 may be delivered to a multi-stage separation system where the wetted, mixed waste is separated into multiple streams. The separation system may include one or more vessels, which may be oriented at an angle. The vessels may include a cylindrical barrel with walls defining a separation surface, and may rotate about a central axis. The separation surface may be configured with a series of openings to permit mixed waste having one or more predetermined sizes to exit through the openings for collection, while the mixed waste having a size that is larger than the openings travels through the vessel and exits the distal end. The openings may be configured as screens. For instance, the vessels may be configured as trommel screens. One or more vessels (e.g., trommels) may be used according to the present disclosure, with multiple vessels arranged in series. The vessels may operate mechanically, such as via a motor, to allow for rotation of the vessel about its central axis at a selected rotation rate and angle.

According to the present disclosure, the vessels may be configured to receive a stream of water simultaneously with receipt of the wetted mixed waste stream to enable water to be further absorbed into water-permeable waste materials. The vessels may rotate during receipt of the water and wetted mixed waste stream, for instance, at ambient pressure and at ambient temperature or at a temperature of the waste stream exiting the bag opener 10. Water may be delivered at a proximal end of the vessel and may flow along the vessel as well as through the openings as the wetted mixed waste travels through the vessel. Additionally or alternatively, the water may be delivered at different points along a length of the vessel to enable further water absorption by the wetted mixed waste as the waste progresses through the vessel. Water may be collected and recycled as it flows through the vessels. In some implementations, heat may be added to the water to aid in breakdown of adhesives and fiber bonds. Separation of the waste occurs by gravity and density separation in water, which is in contrast to prior approaches that use pulping, anaerobic digestion, fermentation and/or glycolysis; and for instance, the multi-stage waste separation processes of the present disclosure may be free of pulping, anaerobic digestion, fermentation and/or glycolysis. In implementations, the vessel may not be operated under pressurized conditions.

Figure 3:
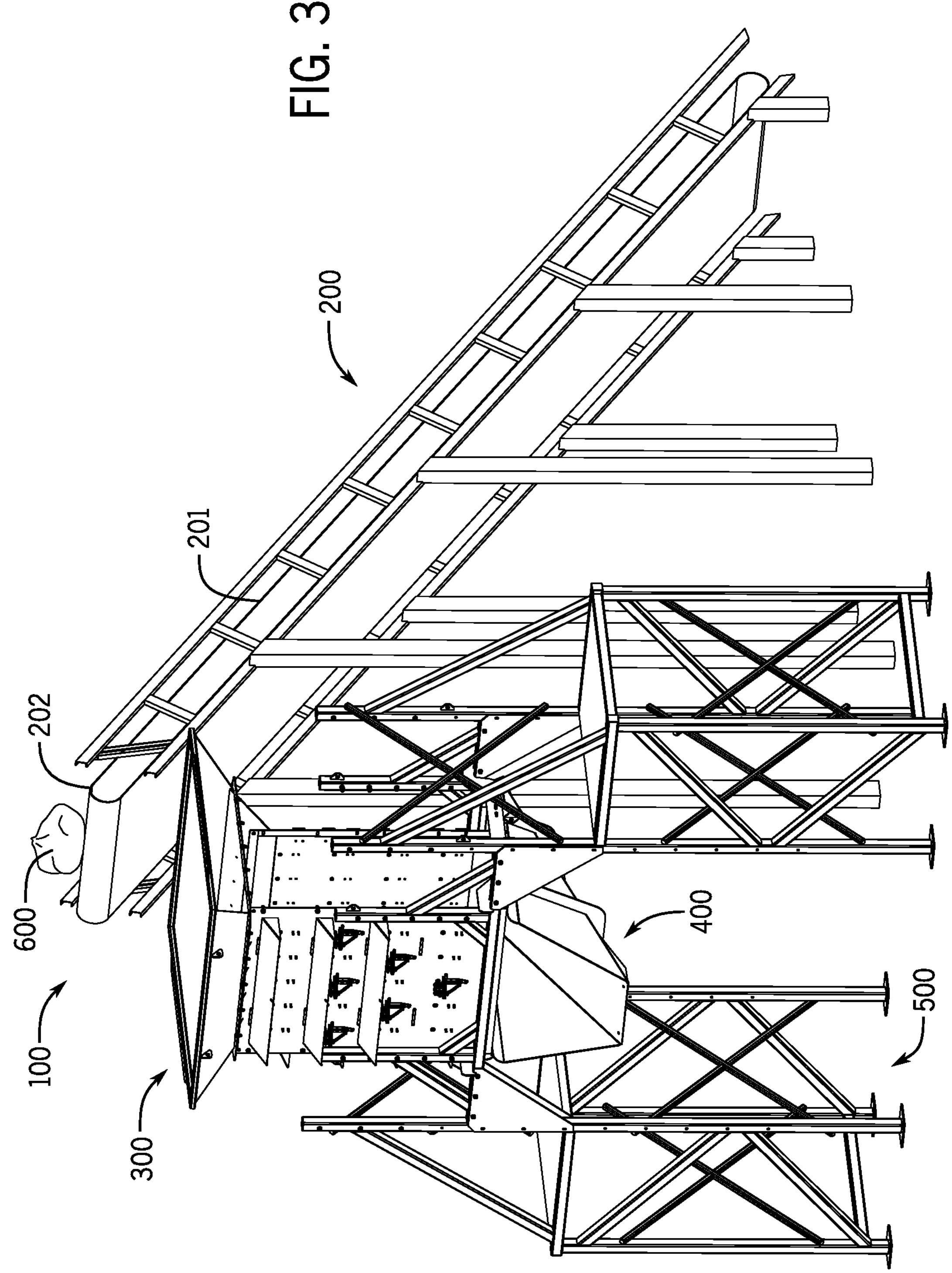
FIG. 3 illustrates a waste processing system according to implementations of the preset disclosure.

Referring to FIG. 3, illustrated is a waste processing system 100 according to the preset disclosure. The waste processing system 100 may include a conveyor 200, a fluid-driven bag opener device 300, a collection device 400, and an adjustable support frame 500. The system 100 may be configured to receive mixed solid waste including flexible containers 600 containing mixed solid waste and create openings in the flexible containers 600 for the release of the mixed solid waste therein.

As shown in FIG. 3, the conveyor 200 of the waste processing system 100 may be configured as a ramp 201 with a moving transport surface 202, such as a belt, for transporting flexible containers 600 such as plastic bags and paper bags to varying locations within the waste processing system 100, including to the fluid-driven bag opener 300 of the present disclosure. As mixed solid waste is received at the waste processing system 100, the mixed solid waste or portions thereof may be provided to the conveyor 200, which may transport the mixed solid waste including the flexible containers 600. The conveyor 200 may be angled at a selected angle, such as about 10 degrees to about 45 degrees and may transport the flexible containers 600 to an elevated position. For instance, the conveyor 200 may extend from a ground level at the selected angle along a conveyor length that enables the conveyor 200 to transport the flexible containers vertically up to a height corresponding to the opening of the fluid-driven bag opener 300, such as up to a height of 10 to 48 feet. As the flexible containers 600 pass through the fluid-driven bag opener device 300, openings may be created in the flexible containers 600 by fluid sprayed from the fluid-driven bag opener device 300, and the fluid may begin to saturate the mixed solid waste passing therethrough. The opened flexible containers, the mixed solid waste, and fluid (e.g., water) may be collected by the collection device 400 and guided towards subsequent downstream waste processing devices. The collection device 400 may be coupled to an egress portion of the fluid-driven bag opener device 300, together which may be height-adjustable by adjusting a vertical position of the fluid-driven bag opener device 300 relative to the adjustable support frame 500 and/or by adjusting a vertical height of the leg supports of the adjustable support frame 500. For instance, the fluid-driven bag opener device 300 or the collection device 400 may be supported above a ground surface by about 8 to 24 feet, or may correspond to the height at which the egress of the fluid-driven bag opener device 300 or a collection device 400 stands above a ground.

Figure 4:
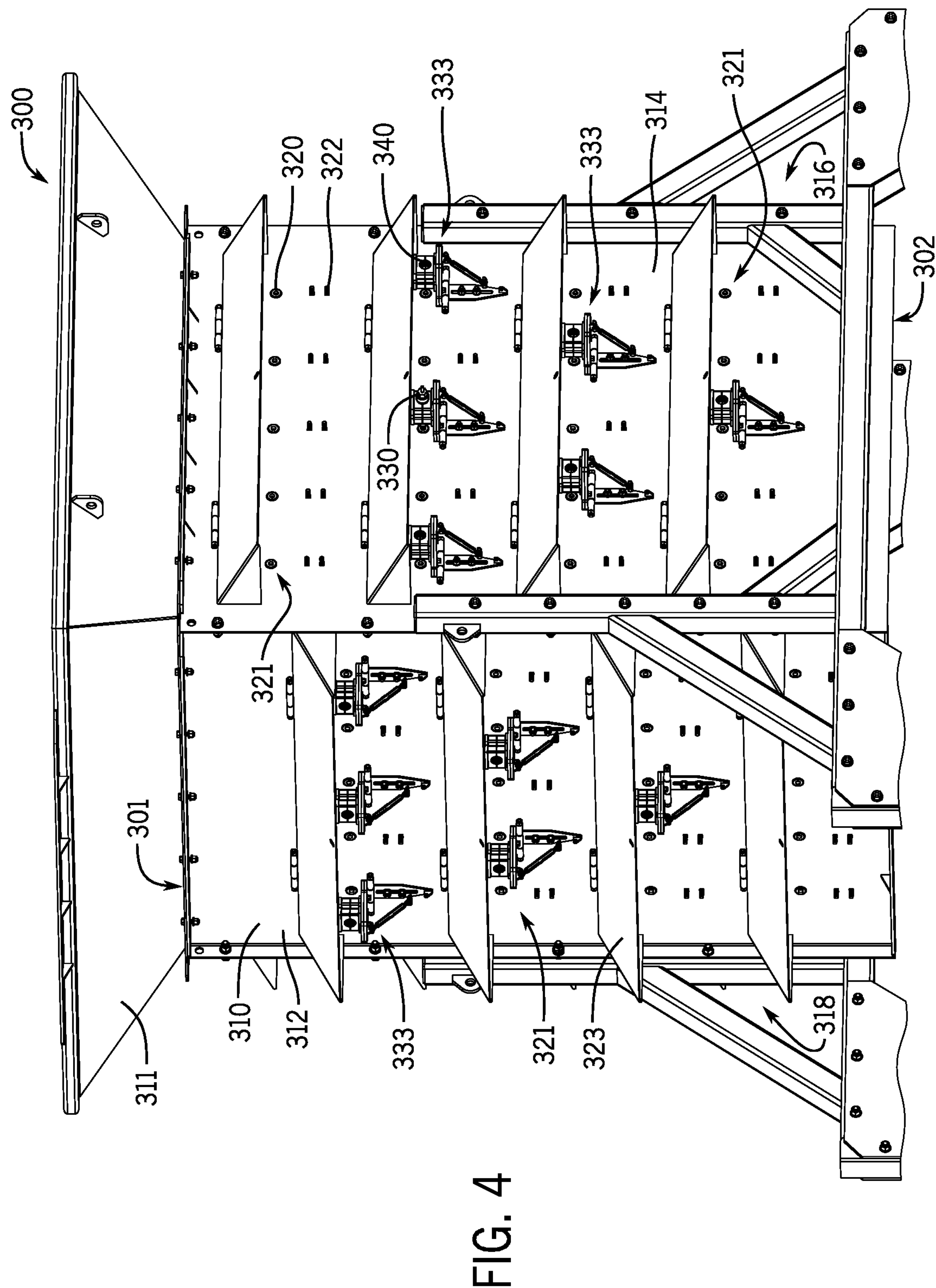
FIG. 4 illustrates an external view of a fluid-driven bag opener device of the waste processing system of FIG. 3.

Turning to FIG. 4, the fluid-driven bag opener device 300 of the waste processing system 100 is illustrated. The fluid-driven bag opener device 300 may be configured for separating mixed solid waste from the flexible containers 600 holding the mixed solid waste. An ingress 301 and an egress 302 may be defined by a housing 310 of the fluid-driven bag opener device 300. The ingress 301 of the housing 310 may couple to an entrance chute 311 including tapered walls leading towards the sidewalls 312, 314, 316, 318 defining the housing 310. The housing 310 may be configured to permit a plurality of the flexible containers 600 holding the mixed solid waste to pass through the housing 310 via the ingress 301 and the egress 302, and for instance may have a tunnel configuration where the housing 310 between ingress 301 and egress 302 has a substantially uniform cross-section, e.g., a substantially uniform square-shaped, cylindrical-shaped or circular-shaped cross-section, and the opening defined by the ingress 301 may be substantially the same size as the opening defined by the egress 302 of the housing. The sidewalls 312, 314, 316, 318 may be substantially planar walls and may define the housing 310 or a portion thereof. Along the sidewalls 312, 314, 316, 318 of the housing 310, a plurality of openings 320 may be defined, where the openings 320 may be configured to receive fluid sprayed from nozzles 330 for delivery of the sprayed fluid into an interior of the housing 310 during the bag opening operation. The openings 320 may extend from an exterior to an interior of the housing 310, and each sidewall 312, 314, 316, 318 may include a plurality of the openings 320, such as 10-40, 10-20, or 20-40 openings 320 per sidewall. The openings 320 may be defined in individual rows 321 across a respective sidewall with 1-10, 1-8, 1-5, or 1-3 openings 320 per row, and the number of openings 320 per row 321 may differ across rows 321. The rows 321 of openings 320 may be distributed vertically along the sidewalls, such as 2 to 5 rows per sidewall. In some implementations, the rows 321 on opposing sidewalls, e.g., sidewalls 312 and 316, may be vertically offset or staggered relative to one another to enable spray to be delivered at differing locations along the vertical length of the fluid-driven bag opener device 300. In implementations where not all of the openings 320 are used, unused openings 320 may be plugged or sealed.

In some implementations, each of the sidewalls 312, 314, 316, 318 of the housing 310 may include the plurality of openings 320, while in other implementations only some of the sidewalls may include the openings 320, such as opposing sidewalls 312 and 316, opposing sidewalls 314 and 318, or only one of the sidewalls 312, 314, 316, or 318 may include the plurality of openings 320. In some implementations, the rows 321 of openings 320 of opposing sidewalls may be arranged offset by 180° to enable spray to be delivered from opposite sides of the housing 310 as provided herein. Alternatively, the rows 321 of openings 320 may be arranged offset by 90° to enable spray to be delivered at right angles relative to each other, or at another selected angle. In other implementations, the housing 310 may be configured without openings 320, and the nozzles 330 may be positioned within an interior of the housing 310 as provided herein.

The housing 310 may include a plurality of attachment features 322 for joining nozzles 330 to the housing 310 as described herein. In some implementations, hoods 323 may be affixed to an exterior of housing 310 for protecting nozzles 330 and adjustable nozzle support carriages 340, as provided herein. While the hoods 323 are illustrated as extending across a row 321 of openings 320 of the housing 310, the hoods 323 may be configured to individually hood a single nozzle support carriage 340 for protecting the nozzle support carriage 340 and the nozzle 330 situated therein. While the housing 310 of the fluid-driven bag opener device 300 is depicted as having a four-sided cross-section, the housing 310 may be configured with an oval or circular cross-section, or may have more or less than four sides, such as five or six sides.

A plurality of fluid delivery nozzles 330 may be provided on the housing 310 of the fluid-driven bag opener device 300. The nozzles 330 may include a fluid outlet 331 (FIG. 5) and may be configured to spray fluid including water, a mixture of water and chemical, a mixture of water and air, a gas such as air, or combinations thereof. In some implementations, the nozzles 330 may deliver fluid at temperatures below 200° F., such as at ambient temperatures of about 32 to 80° F., or at 32, 38, 40, 45, 60, 70, 80, 90, 100, 125, 150, 175, 200° F., and the nozzles 300 may not deliver the fluid in the form of steam.

The nozzles 330 may be configured to deliver high pressure fluid at an effective stream distance 332 (see FIG. 6) such that a force of the fluid sprayed is sufficient to cause the fluid to penetrate into the flexible containers passing through the housing 310 to thereby create openings in the flexible containers for release of the mixed solid waste held therein. The high pressure fluid may be delivered from the nozzles 330 at a force of about 500 psi to about 10,000 psi, at about 500 psi to about 5,000 psi, at about 1,000 psi to about 2,000 psi, at about 1,000 psi to about 5,000 psi, at about 2,000 psi to about 5,000 psi, or at about 2,000 psi to about 10,000 psi. Further, the nozzles 330 may deliver fluid at a rate of about 0.5 to about 5.0 gallons per minute (gpm), about 0.5 to about 1.0 gpm, about 0.5 to about 2.0 gpm, about 0.5 to about 3.0 gpm, about 1.0 to about 5.0 gpm, about 1.0 to about 4.0 gpm, about 1.0 to about 3.0 gpm. According to implementations, the nozzles 330 may be configured to deliver an oscillating spray, a fixed spray, and/or the spray delivered from the nozzles 330 may be adjustable. In some implementations, the nozzles 330 may be configured to deliver a single stream of oscillating fluid where the stream oscillates from 0-30 degrees. The nozzles 330 may be industrial nozzles such as hydro-excavation nozzles. Further, the nozzles 330 may be powered by one or more pumps fluidly coupled thereto.

Figure 6:
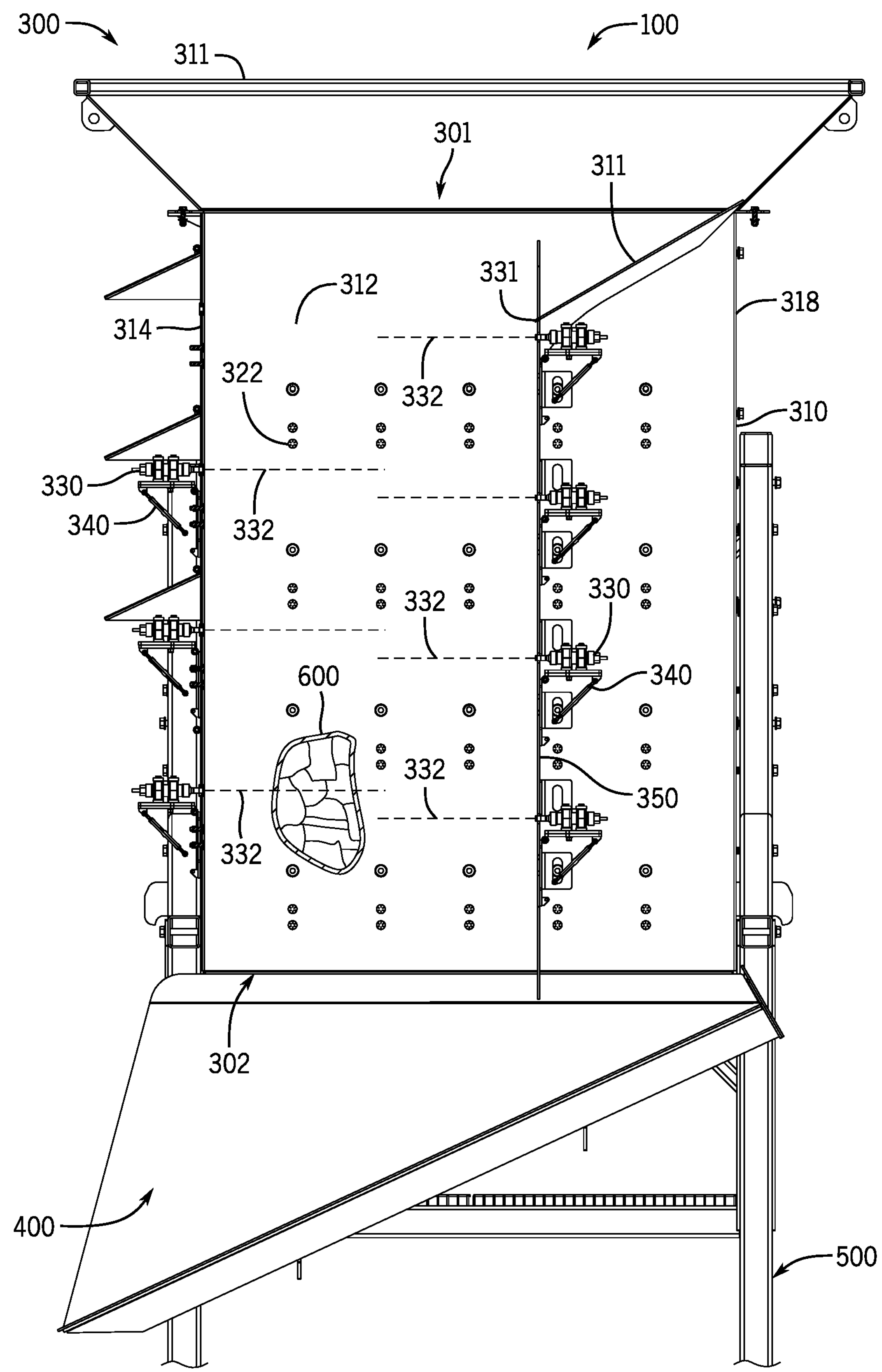
FIG. 6 illustrates a cross-section view of the fluid-driven bag opener device, a collection device, and an adjustable support frame of the waste processing system of FIG. 3.

The nozzles 330 may be provided as banks 333 of a plurality of nozzles 330 arranged along the rows 321 of the housing 310 at the openings 320. Each bank 333 of nozzles 330 may include 2 to 10 nozzles, 2 to 8 nozzles, 2 to 5 nozzles, or 2, 3, 4, 5, 6, 7, 8, 9 or 10 nozzles, and the number of nozzles 330 per bank 333 may differ among the different banks 333. One or more of the sidewalls of the housing 310, e.g., sidewalls 312 and 316, may include one or more banks 333 of nozzles 330, and for instance, each sidewall may include 1 to 10 banks 333 of nozzles 330, such as 1 to 10, 2 to 8, 2 to 5, or 1, 2, 3, 4, 5, 6, 7, 8, 9 or 10 banks 333 of nozzles 330. The banks 333 of nozzles 330 may be arranged on one or a plurality of the sidewalls 312, 314, 316, 318. In some implementations, the banks 333 of nozzles 330 may be arranged at 180° relative to each other or on opposing sides of the housing 310. The banks 333 of nozzles 330 may be vertically staggered on opposing sides, for instance as illustrated in FIGS. 1 and 6, and may be horizontally staggered such that each of the outlets 331 spray fluid within a different location of the housing 310 interior. In some implementations, the number of nozzles 330 provided on the housing 310 may correspond to a number of the plurality of the openings 320 per sidewall, such as 20 nozzles for each of 20 openings 320 per sidewall, or fewer nozzles 330 may be provided per sidewall than openings 320, while unused openings may be sealed or plugged. In another example, each sidewall including nozzles 330 may have 20 total nozzles 330 in two or more banks 333 of nozzles 330, such as four banks 333 of nozzles 330. In this example, the nozzles 330 may be provided on two opposing sidewalls for a total of 40 nozzles.

Figure 5:
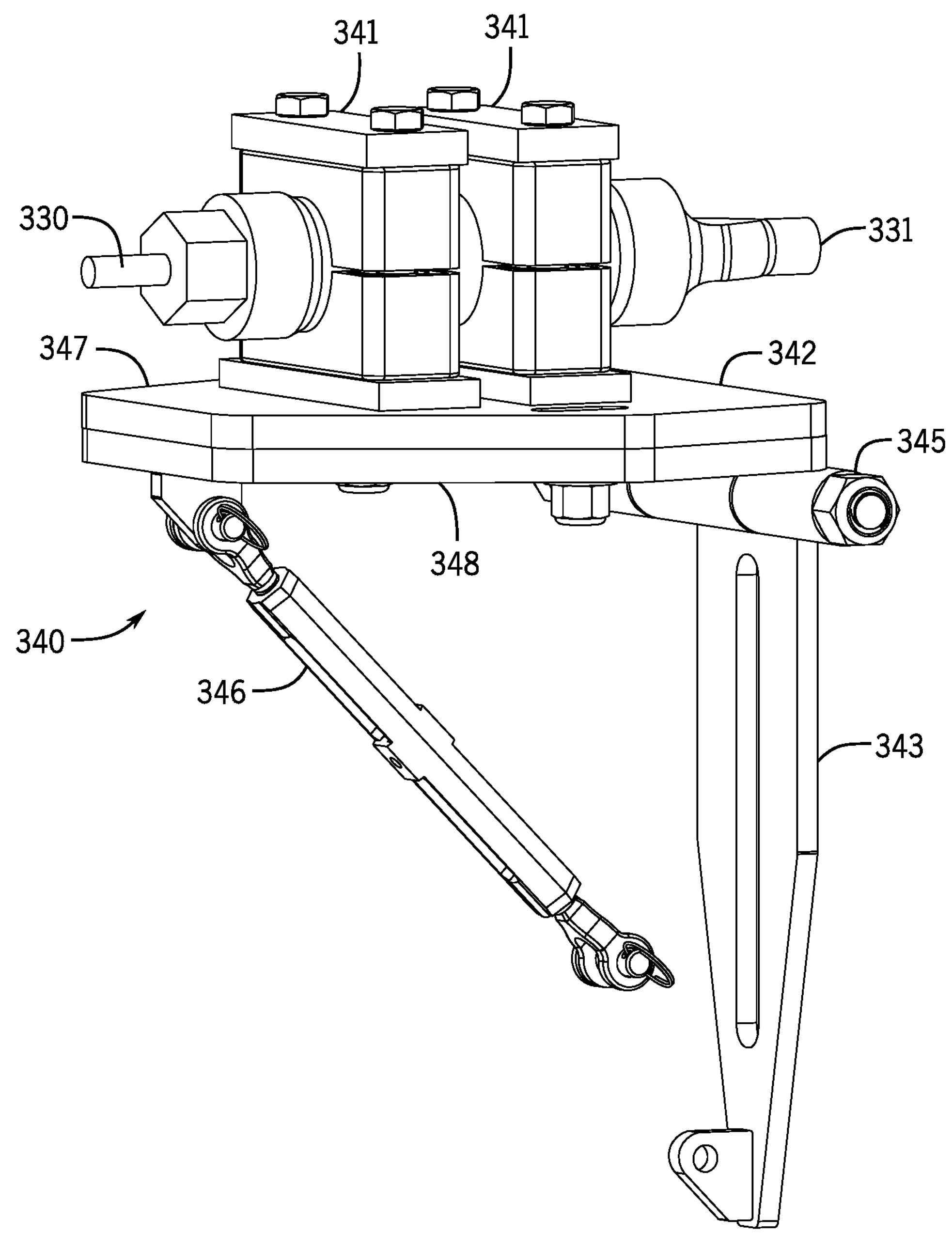
FIG. 5 illustrates a nozzle support carriage coupled to a nozzle of the fluid-driven bag opener device of FIG. 4.

With reference to FIG. 5, each of the nozzles 330 may be attached to the housing 310 via a nozzle support carriage 340, which may connect to an attachment point 322 of the housing 310 along one or more of the sidewalls 312, 314, 316, 318. The nozzle support carriage 340 may be configured to hold the nozzle 330 and position the nozzle outlet 331 at an opening 320 of the housing 310 in order for the nozzle 330 to deliver spray through the opening 320 and into an interior of the housing 310 during the bag opening operation of the present disclosure. The nozzle support carriage 340 may be adjustably mounted to the housing 310 and configured to releasably hold one of the nozzles 330. For instance, the nozzle 330 may be held by one or more releasable clamps 341 of the nozzle support carriage 340, and the clamps 341 may enable the nozzles 330 to rotate and/or translate in the clamps 341 prior to securing the clamps 341 in a locked position. The one or more clamps 341 may be joined to a base 342 of the nozzle support carriage 340, and the base 342 may translate vertically, e.g., on the y-axis, by upward or downward movement of a first support leg 343 of the nozzle support carriage 340 relative to the housing 310. For instance, the first support leg 343 may be coupled to the attachment point 322 of the housing 310 by a releasable fastener that enables vertical movement of the nozzle support carriage 340 relative to the housing 310 prior to securing the releasable fastener. The base 342 may pivot around a main hinge 345 of the nozzle support carriage 340 and may adjust an angular position of the nozzle 330, e.g., around the x-axis, by about +/−20 degrees. A second support leg 346 may be used to adjust the angular position of the base 342 and may extend and be coupled between the housing 310 a bottom of the nozzle support carriage 340. In addition, the base 342 may include a top plate 347 movable relative to a bottom plate 348 prior to securing the two, e.g., via a releasable fastener, and the top plate 347 may translate along the x- and z-axes independently, e.g., on the x-axis side-to-side and along the z-axis backwards and forwards, relative to the housing 310 wall to which the support carriage 340 is attached. In some implementations, the bottom plate 348 may serve as an attachment point for one end of the support leg 346, as illustrated in FIG. 5. The nozzle support carriage 340 may accordingly be used to adjust a position of the nozzle 330 relative to an opening 320 of the housing 310, including adjusting an angular position of the nozzle outlet 331 such that a fluid sprayed from the nozzle outlet 331 into the interior of the housing 310 may be delivered at a selected angle. While the nozzle support carriages 340 of FIG. 5 are depicted at the exterior of the housing 310, the nozzle support carriage 340 may be joined to the interior of the housing 310 and, for example, a position of the nozzle 330 may be reversed such that the nozzle outlet 331 is directed to an interior of the housing 310. The nozzle support carriages 340 may be configured such that the nozzles 330 may be coupled to fluid supply lines for fluidly connecting to a motive fluid source such as a fluid delivery pump.

Turning to FIG. 6, a cross-section view of a portion of the waste processing system 100 is illustrated including the fluid-driven bag opener device 300, the collection device 400, and the adjustable support frame 500, according to the preset disclosure. As illustrated, the fluid-driven bag opener device 300 may include an adjustable sidewall 350 movably arranged in an interior of the housing 310. The adjustable sidewall 350 may be configured as the sidewalls 312, 314, 316 and 318 provided herein, but rather than defining an exterior of the housing, the adjustable sidewall 350 may be arranged within the interior of the housing 310 and be adjustably movable therein and may define a sidewall of the housing 310 through which the flexible containers 600 pass through. To facilitate movement of the flexible containers 600 into the interior of the housing 310 with the adjustable sidewall 350 positioned therein, the tapered walls of the entrance chute 311 may include an extension extending from one of the fixed sidewalls, such as the fixed sidewall 318 as illustrated in FIG. 6. The perimeter of the adjustable sidewall 350 may include fasteners configured to fasten along opposing sidewalls of the housing 310, such as at sidewall 312 and 316 and secure the adjustable sidewall 350 from moving during the bag opening operation. Like the sidewalls disclosed herein, the adjustable sidewall 350 may include a plurality of nozzles 330 and nozzle support carriages 340 for providing streams of sprayed fluid from the nozzle outlets 331 into the interior of the housing 310 at a selected angle.

The adjustable positioning of the adjustable sidewall 350 may adjust a cross-sectional size of the interior of the housing 310 and may provide an adjustable internal chamber of the housing 310 to facilitate the effectiveness of the spray delivered from the nozzles 330. For instance, the nozzles 330 may be configured with an effective stream distance 332 of 0 in. to 36 in., where the effective stream distance 332 is a distance from the nozzle outlet 331 that the fluid stream can effectively penetrate into the flexible containers 600 to create openings therein. Where an internal length of the housing interior from sidewall 314 to sidewall 318 is 66 in., the adjustable sidewall 350 may be adjustably positioned for instance at 6-20 in. increments and may thus incrementally reduce the internal length across the housing 310. In some implementations, the sidewall 350 may be adjusted to the position illustrated in FIG. 6, and the internal length of the housing interior may be adjusted to 41 inches. With a 41 in. internal length of the housing 310, and an effective stream distance 332 of 0 in. to 36 in., the flexible containers passing through the housing 310 may be sprayed with the streams of fluid from the nozzles 330 positioned on the sidewall 350 and openings or perforations may be created by the sprays from the nozzles 330 when the flexible containers 600 are positioned within the effective stream distance 332, or the streams from the nozzles 330 positioned on the sidewall 350 may push the flexible containers towards the opposing sidewall, e.g., sidewall 314, and within the effective stream distance 332 of such opposing sidewall where the nozzles 330 of the sidewall deliver spray at the effective stream distance 332 to create openings in the flexible containers. Thus, the effective stream distance 332 of up to 36 in. with an internal length of the housing 310 being 41 in. will result in the stream from the nozzle 330 penetrating the flexible containers 600 when the stream contacts the container 600 at up to 36 in from the nozzle outlet 331, or will result in the stream pushing the container 600 to the opposite side of the housing 310 so close to the sidewall or onto the sidewall where a stream from a nozzle 330 at such opposing side penetrates the container 600 at the nozzle's effective stream distance 332, or the stream from the nozzle 300 will both penetrate the flexible containers 600 and push them to the opposite side of the housing.

In some implementations, the effective stream distance 332 may be selected to be about 50 percent or more of the internal distance across the interior of the housing 310. For instance, a housing 310 with a 66 in. internal length may employ nozzles 330 having an effective stream distance 332 of 0 to 33 in. or more, such as 0 to 36 in., 0 to 48 in., or 0 to 54 in. It will be understood by those of skill that while the effective stream distance 332 may be effective to penetrate into the flexible containers 600 to create openings therein, the streams delivered from the nozzles 330 may be longer than the effective stream distance 332, and the streams may spray across the entire interior of the housing 310 and against the opposing sidewall of the housing 310. As a result, the streams may force the flexible containers 600 towards or even against the opposing sidewall. Thus even where the stream of one nozzle 330 does not penetrate into a flexible container, e.g., where the flexible container falls outside of the effective stream distance 332, such stream nonetheless forces the flexible container towards or against the opposing sidewall where nozzles 330 may create openings in the flexible containers. It will be appreciated that because nozzles 330 may be selected based on their effective stream distance 332 and an internal length of the housing 310, some implementations of the fluid-driven bag opener device 300 may not include the adjustable sidewall 350.

In use, the flexible containers 600 may be delivered to the waste processing system 100 where the flexible containers 600 may be transported by the conveyor 200 to the fluid-driven bag opener device 300. The flexible containers 600 may drop into the ingress 301 of the fluid-driven bag opener device 300 and begin to fall into the interior of the housing 310. Nozzles 330 may direct a fluid spray, such as an oscillating spray, towards an interior of the housing at a force sufficient to cause the fluid to penetrate into the flexible containers 600 passing through the housing 310 to thereby create openings in the flexible containers 600 to enable release of the mixed solid waste held therein. The spray may begin to soak, saturate, perforate and break apart the mixed solid waste passing through the housing 310, which may facilitate further processing of the mixed solid waste. The flexible containers 600 may each fall through the housing 310 of the fluid-driven bag opener device 300 for a free fall time of 0.5 to 2.5 seconds, or for an amount of time needed for the flexible containers 600 to fall through the length of the housing. During this time the nozzles 330 may each deliver a stream of fluid at 0.5 to 5.0 gpm. For instance, 20-40 nozzles on each of one or more sidewalls may deliver a stream of fluid into the interior of the housing 310. When all nozzles are operational, for example, this may result in the fluid-driven bag opener device 300 delivering fluid at 10 to 400 gpm, or at 20 to 300 gpm, or at 40 to 200 gpm, or at 50 to 300 gpm, or at 100 to 200 gpm, or at 100 to 300 gpm. In some implementations, the fluid-driven bag opener device 300 may include two to ten banks 333 of nozzles 330, such as seven banks 333 illustrated in FIG. 6, distributed in a vertically and horizontally staggered arrangement across two sidewalls, such as sidewalls 314 and 350, and each of the nozzles 330 may deliver an effective stream distance 332 resulting in the flexible container 600 passing through one or more of the fluid streams at the effective stream distance 332 of the nozzle 330, which may result in one or more openings being created in the flexible container 600. In some implementations, a single sidewall may deliver fluid spray from the nozzles 330, and the housing 310 may be configured to enable the nozzles to create openings in the flexible container 600, for instance by configuring the interior length of the housing 310 to correspond to the effective stream distance 332 or a portion thereof.

The remaining recyclable and landfill-bound materials may be processed using a material recovery facility (MRF), for instance, where large pieces of glass, plastics, metals and remaining paper products (e.g., cardboard) are sorted with the remainder of the non-recyclable materials being transported to a landfill or for incineration.

The fluid-driven bag opener device 300 of the present disclosure differs from prior bag opener devices due to such prior devices including a toothed wheel that separates and pierces the flexible containers by the teeth and by compressing the flexible containers to cause bursting and thus release of the mixed solid waste. Accordingly, the fluid-driven bag opener device 300 of the present disclosure may be free of toothed wheels and the fluid-driven bag opener device 300 may rely on the streams of fluid to pierce and perforate the flexible containers 600 for the release and wetting of the mixed solid waste contained therein. In addition, the fluid-driven bag opener device 300 of the present disclosure differs from prior waste processing techniques described herein because the fluid sprayed may not be in the form of steam and the waste processing may not be conducted under vacuum conditions.

Other examples and implementations are within the scope and spirit of the disclosure and appended claims. For example, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Consequently, variations and modifications commensurate with the teachings, and skill and knowledge of the relevant art, are within the scope of the disclosure.

What is claimed is:

1. A device configured for separating mixed solid waste from flexible containers holding the mixed solid waste, comprising:

- a housing configured with an ingress and an egress oriented vertically or at a downward angle relative to a ground surface for permitting a plurality of the flexible containers holding the mixed solid waste to drop into the ingress and fall through the housing and exit via the egress by the force of gravity, the plurality of flexible containers comprising plastic bags and paper bags; and
- at least two sets of a plurality of fluid delivery nozzles, wherein a first set of the plurality of fluid delivery nozzles is arranged along a sidewall at a first side of the housing, and wherein a second set of the plurality of fluid delivery nozzles is arranged along the sidewall at a second side of the housing opposite the first side;
- at least two hoods coupled to an exterior of the housing along the sidewall, each hood of the at least two hoods covering one set of the at least two sets of the plurality of fluid delivery nozzles; and
- at least one nozzle support carriage coupled to the exterior of the housing, the at least one nozzle support carriage comprising:
  - a support plate supporting a nozzle of the plurality of fluid delivery nozzles;
  - a support leg; and
  - a hinge coupling the support plate to the support leg,
  - wherein the nozzle support carriage is configured to adjust at least an angular position of the nozzle with respect to the housing,
- wherein nozzle outlets of the first set of nozzles direct high pressure water streams-towards the second side of the housing, and nozzle outlets of the second set of nozzles direct high pressure water streams towards the first side of the housing,
- wherein the high pressure water streams from the nozzle outlets is delivered at a force sufficient to cause the water to penetrate into the flexible containers falling through the housing to thereby create openings in the flexible containers for release of the mixed solid waste held therein.

2. The device of claim 1, wherein the first set of the plurality of fluid delivery nozzles is arranged at a vertical position of the housing that differs from a vertical position of the housing where the second set of the plurality of fluid delivery nozzles is arranged.

3. The device of claim 2, further comprising a third set of a plurality of fluid delivery nozzles, wherein the third set is arranged at the first side and at a vertical position of the housing that differs from the vertical positions of the first and second sets of the plurality of fluid delivery nozzles.

4. The device of claim 3, wherein the nozzle outlets of the first set of fluid delivery nozzles spray across the housing using the high pressure water streams that direct the flexible containers away from the first set of nozzles such that the flexible containers are directed towards the second set of nozzles at the second, opposite side of the housing, and the nozzle outlets of the second set of fluid delivery nozzles spray across the housing using the high pressure water streams that direct the flexible containers away from the second set of nozzles such that the flexible containers are directed towards the third set of nozzles at the first side of the housing such that the flexible containers move from side to side within the housing and the high pressure water streams penetrate the flexible containers and saturate mixed solid waste held in the flexible containers.

5. The device of claim 4, wherein the fluid delivery nozzles emit an oscillating spray perpendicular to the housing sidewall along which the fluid delivery nozzles are attached.

6. The device of claim 1, wherein the fluid delivery nozzles emit an oscillating spray perpendicular to the housing sidewall along which the nozzles are attached.

7. The device of claim 1, wherein a top portion of the nozzles are shielded within an interior of the housing.

8. The device of claim 7, wherein the nozzles are shielded by a ramp configured to cover the top portion of the nozzles.

9. The device of claim 1, wherein the nozzles are configured to operate at about 500 psi to about 10,000 psi.

10. The device of claim 1, wherein at least one hood of the at least two hoods covers the at least one nozzle support carriage.

11. The device of claim 1, wherein the housing includes an opening about 3 feet to about 12 feet wide and a vertical length of about 3 feet to 24 feet.

12. A device configured for separating mixed solid waste from flexible containers holding the mixed solid waste, comprising:

a housing configured with an ingress and an egress oriented vertically or at a downward angle relative to a ground surface for permitting a plurality of the flexible containers holding the mixed solid waste to drop into the ingress and fall through the housing and exit via the egress by the force of gravity, the plurality of flexible containers comprising plastic bags and paper bags;

at least two sets of a plurality of fluid delivery nozzles, wherein a first set of the plurality of fluid delivery nozzles is arranged along a sidewall at a first side of the housing, wherein a second set of the plurality of fluid delivery nozzles is arranged along the sidewall at a second side of the housing;

at least two hoods coupled to an exterior of the housing along the sidewall, each hood of the at least two hoods configured to cover at least one nozzle in one set of the at least two sets of the plurality of fluid delivery nozzles; and at least one nozzle support carriage coupled to the exterior of the housing, the at least one nozzle support carriage adapted to support a nozzle of the plurality of fluid delivery nozzles, wherein the nozzle support carriage is configured to adjust at least an angular position of the nozzle with respect to the housing by about +/−20 degrees, wherein nozzle outlets of the first and second sets of nozzles direct high pressure water streams towards an interior of the housing, wherein the high pressure water streams from the nozzle outlets is delivered at a force sufficient to cause the water to penetrate into the flexible containers falling through the housing to thereby create openings in the flexible containers for release of the mixed solid waste held therein.

13. The device of claim 12, wherein the nozzle outlets of the first set of fluid delivery nozzles spray across the interior of the housing using the high pressure water streams that direct the flexible containers away from the first set of nozzles, and the nozzle outlets of the second set of fluid delivery nozzles spray across the interior of the housing using the high pressure water streams that direct the flexible containers away from the second set of nozzles such that the flexible containers move across the housing while passing through the housing towards the egress, and the high pressure water streams penetrate and saturate mixed solid waste held in the flexible containers.

14. The device of claim 12, wherein the fluid delivery nozzles emit an oscillating spray perpendicular to the housing sidewall along which the fluid delivery nozzles are attached.

15. The device of claim 12, wherein the first set of the plurality of fluid delivery nozzles is arranged at a vertical position of the housing that is vertically higher from a vertical position of the housing where the second set of the plurality of fluid delivery nozzles is arranged.

16. A method of separating mixed solid waste from flexible containers holding the mixed solid waste, comprising:

at the device of claim 1, deposit the plurality of the flexible containers holding the mixed solid waste into the ingress of the housing of the device; and using the at least two sets of a plurality of fluid delivery nozzles of the device to direct an oscillating spray towards an interior of the housing via the nozzle outlets of the fluid delivery nozzles such that oscillating high pressure water streams from the nozzle outlets is delivered at the force sufficient to cause the water to penetrate into the flexible containers falling through the housing by the force of gravity to thereby create the openings in the flexible containers for release of the mixed solid waste held therein, wherein the flexible containers having the openings and the high pressure water streams falls through the egress of the housing for further mixed solid waste processing.

* * * * *